(12) United States Patent
Shim et al.

(10) Patent No.: US 7,788,380 B2
(45) Date of Patent: Aug. 31, 2010

(54) LOAD BALANCING METHOD AND APPARATUS, AND SOFTWARE STREAMING SYSTEM USING THE SAME

(75) Inventors: Jeong-Min Shim, Daejeon (KR); Sung-Joo Kang, Daejeon (KR); Sung-Jin Hur, Daejeon (KR); Wan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 143 days.

(21) Appl. No.: 11/992,133

(22) PCT Filed: Jul. 27, 2006

(86) PCT No.: PCT/KR2006/002948

§ 371 (c)(1),
(2), (4) Date: Mar. 17, 2008

(87) PCT Pub. No.: WO2007/032603

PCT Pub. Date: Mar. 22, 2007

(65) Prior Publication Data

US 2009/0125625 A1       May 14, 2009

(30) Foreign Application Priority Data

Sep. 15, 2005   (KR)   .................. 10-2005-0086335

(51) Int. Cl.
   *G06F 15/173*   (2006.01)
   *G06F 15/16*   (2006.01)
(52) U.S. Cl. .................. 709/226; 709/229; 709/231
(58) Field of Classification Search .................. 709/226
   See application file for complete search history.

(56) References Cited

U.S. PATENT DOCUMENTS

| 6,888,797 B1 | 5/2005 | Cao et al. |
| 2002/0161908 A1 | 10/2002 | Benitez et al. |

(Continued)

FOREIGN PATENT DOCUMENTS

| JP | 11-328067 | 11/1999 |
| JP | 2000-311130 | 11/2000 |

OTHER PUBLICATIONS

Ashwatha Matthur, et. al., "Dynamic Load Balancing Across Mirrored Multimedia Servers", Department of Computer Science and Electrical Engineering, University of Maryland, Baltimore, MD, USA. (Total 4 pages).

(Continued)

*Primary Examiner*—Benjamin R Bruckart
*Assistant Examiner*—Shripal K Khajuria
(74) *Attorney, Agent, or Firm*—Staas & Halsey LLP

(57) ABSTRACT

Disclosed herein is a load balancing method and apparatus which can efficiently distribute load to a plurality of servers providing a software streaming service where a bandwidth-on-demand is different depending on sending times, and a software streaming system using the same. Sessions established between the servers and clients are classified into first sessions which send data for initial execution and second sessions which send data desired by users after the initial execution is completed, and the resulting session information of each of the servers is collected. A total load amount of each of the servers is calculated under the condition that different load weights are applied to the first and second sessions. A server with a minimum one of the total load amounts is selected from among the servers by comparing the total load amounts of the servers with one another, and the selected server is allocated to a new client requesting the software streaming service.

12 Claims, 6 Drawing Sheets

U.S. PATENT DOCUMENTS

2003/0174648 A1 9/2003 Wang et al.
2005/0027875 A1 2/2005 Deng

OTHER PUBLICATIONS

International Search Report (PCT/ISA/210) of International Application PCT/KR2006/002948 (mailed on Nov. 7, 2006).

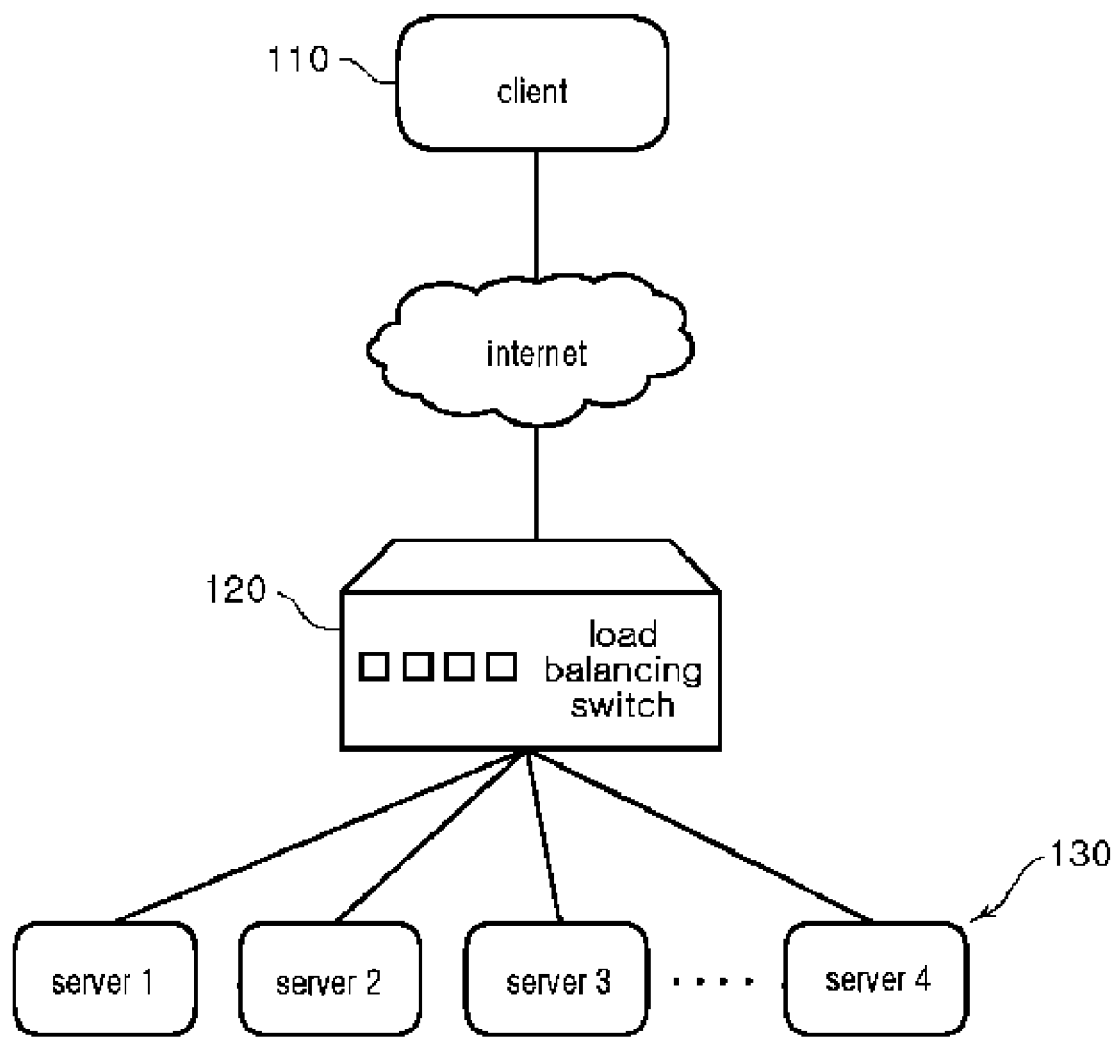
[Fig. 1]

[Fig. 2]
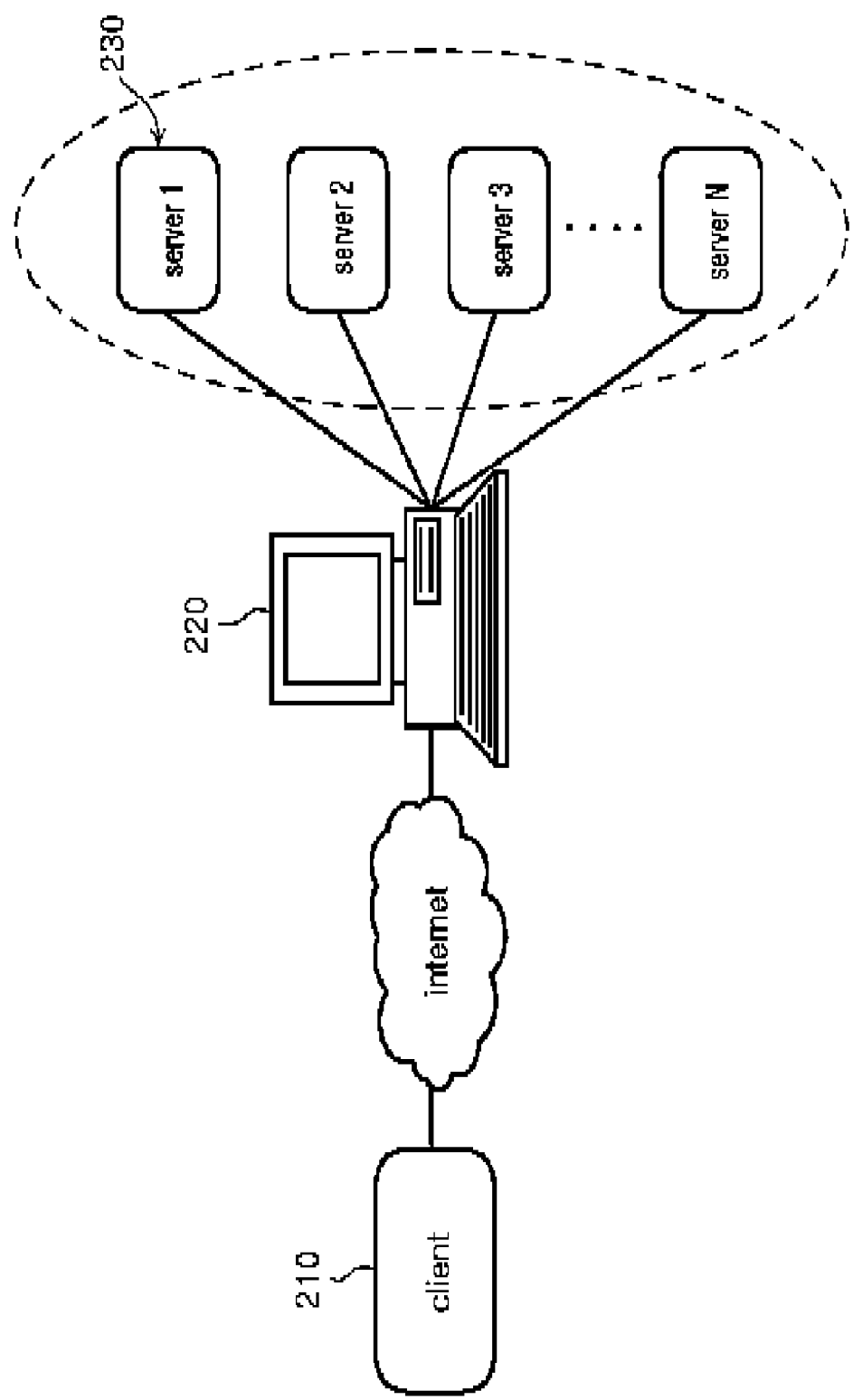

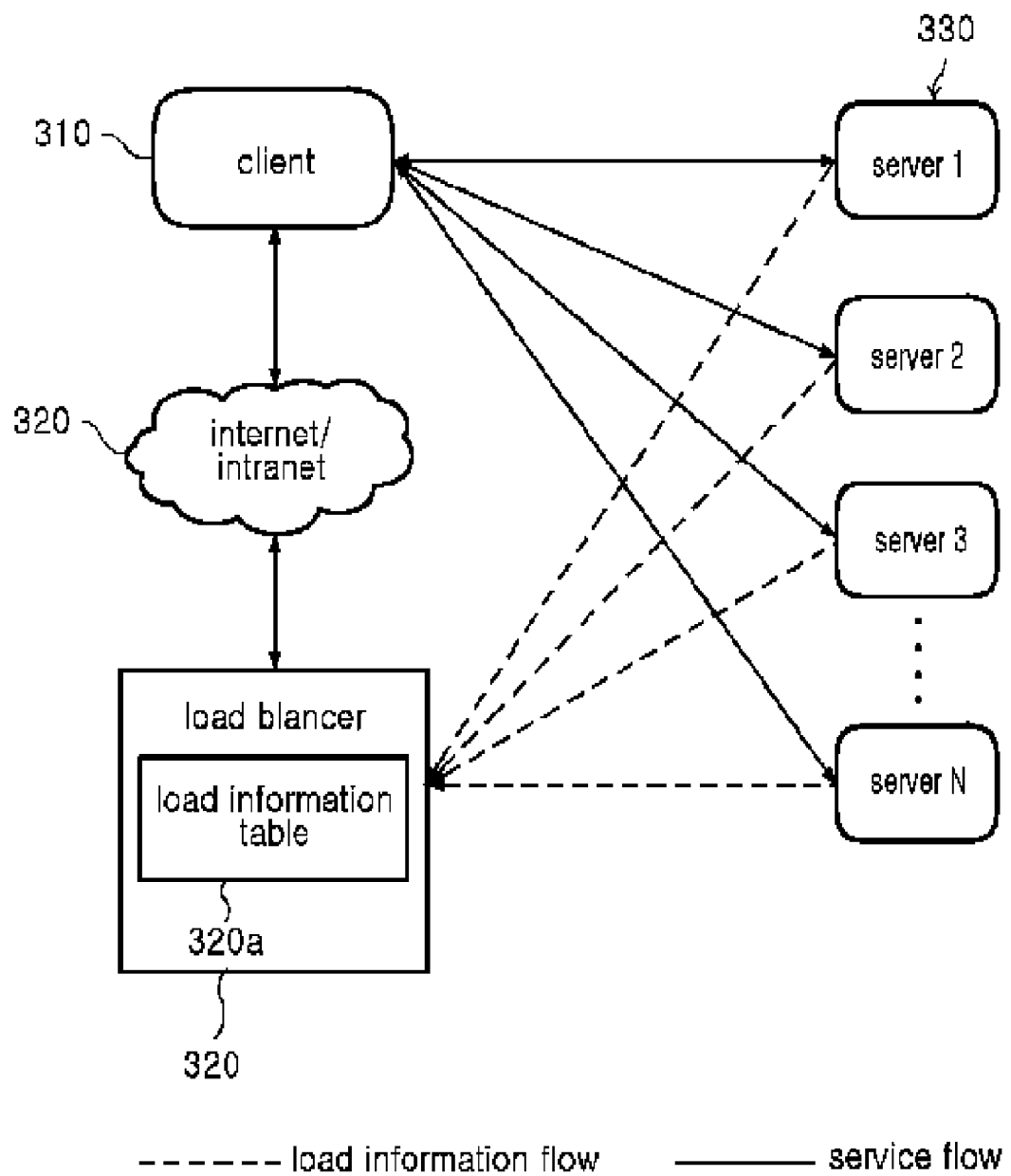
[Fig. 3]

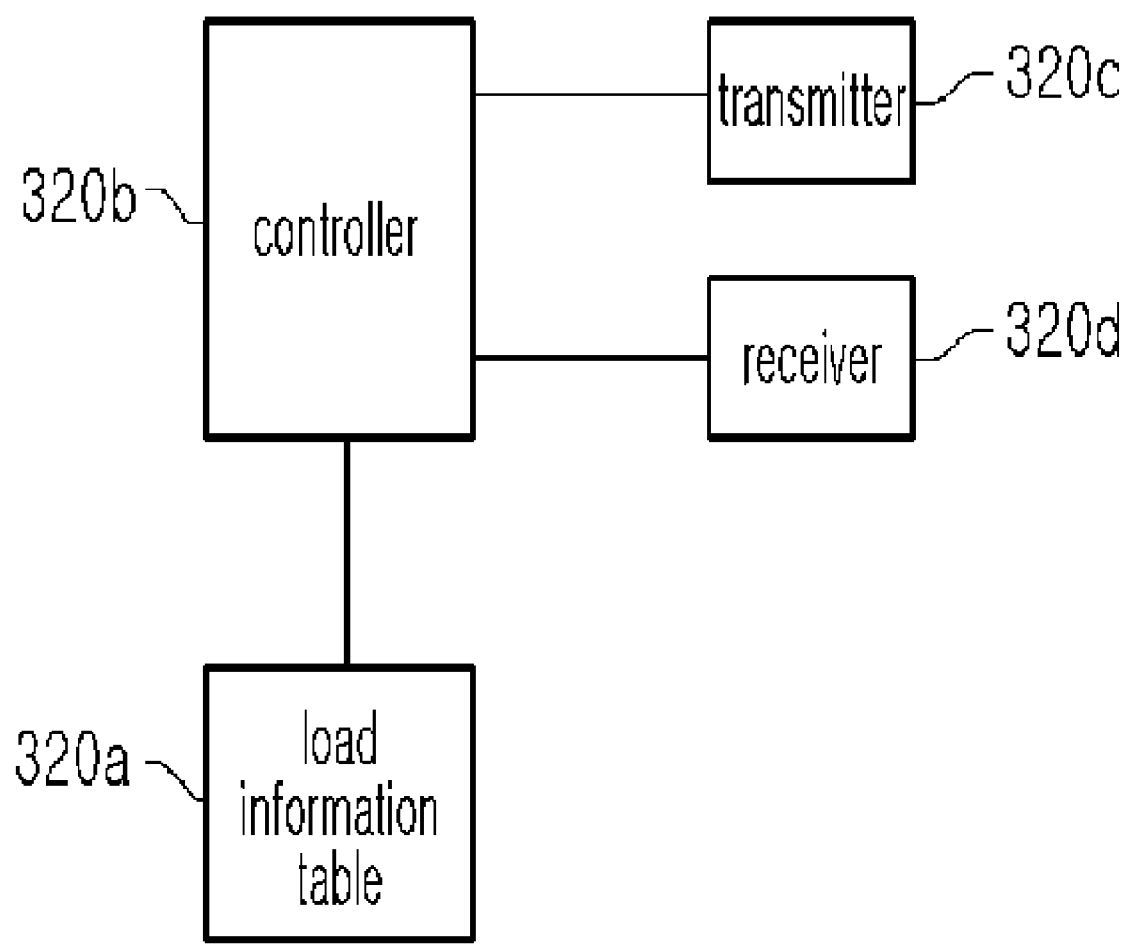
[Fig. 4]

[Fig. 5]
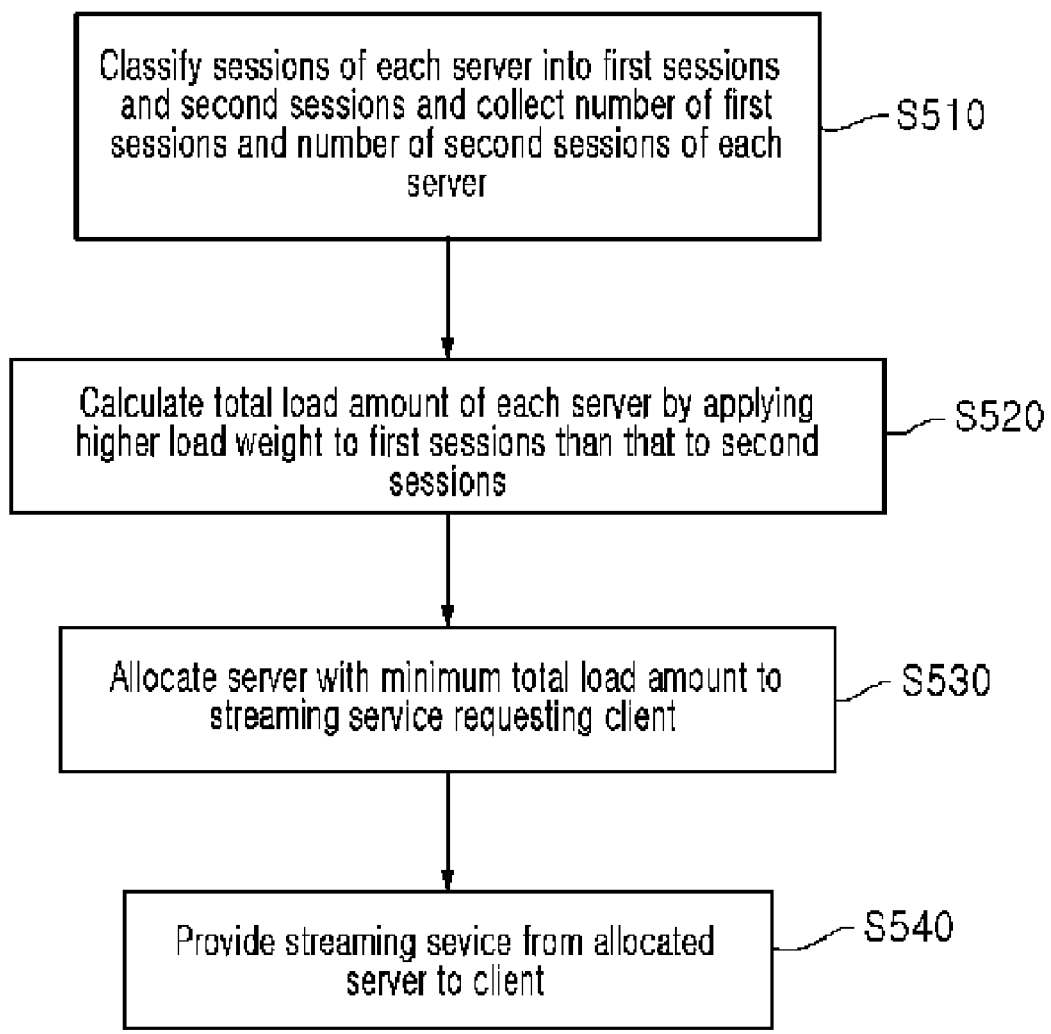

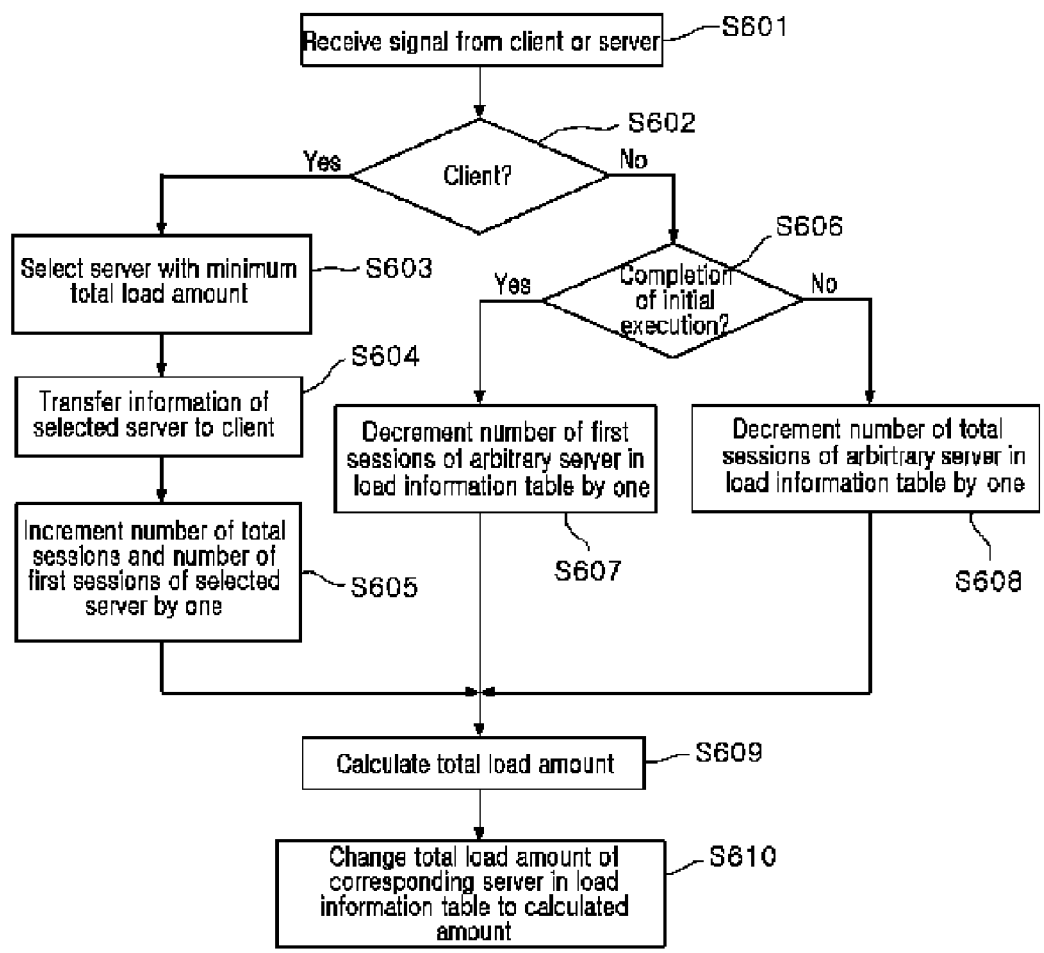
[Fig. 6]

LOAD BALANCING METHOD AND APPARATUS, AND SOFTWARE STREAMING SYSTEM USING THE SAME

CROSS REFERENCE TO RELATED APPLICATIONS

This application claims the benefit under 35 U.S.C. Section 371, of PCT International Application Number PCT/KR2006/002948, filed Jul. 27, 2006, which claimed priority to Korean Application Number 10-2005-0086335, filed Sep. 15, 2005 in Republic of Korea, the contents of all of which are incorporated herein by reference.

TECHNICAL FIELD

The present invention relates to a load balancing method and apparatus which can efficiently distribute load to a plurality of servers providing a software streaming service to clients, and a software streaming system using the same.

BACKGROUND ART

Streaming is a technology that enables either real-time or on-demand distribution of multimedia contents over network. In this streaming technology, a large capacity of data is divided into segments of a constant size and then sent to a user computer. Once only a desired amount of the entire file is sent to the user computer, it is played back by the user computer. The remaining part of the entire file is sent to the user computer while the file is played back by the user computer.

In the case where a multimedia file including a large capacity of audio or video data is sent and played back using an existing downloading technology, it takes too much time to receive all information of the multimedia file. In contrast, in the above-mentioned streaming technology, the file sending can be performed along with the file playback, resulting in a reduction in user's waiting time.

A streaming service provider, which provides a streaming service associated with a multimedia file or software file using the streaming technology, generally comprises a plurality of servers to accommodate a larger number of clients. In this case, the streaming service provider constructs a system to appropriately distribute the clients service requests to the servers to process them.

In this case, load balancing policy is required to appropriately distribute load to the servers.

FIG. 1 is a block diagram of a traditional streaming system with a load balancing structure. As shown in this drawing, a load balancing switch 120 is disposed between a client 110 and a plurality of servers 130.

The load balancing switch 120, which is usually called a layer 4 (L4) switch, is positioned in front of the servers 130 to allocate packets to the respective servers by changing destination IP addresses or media access control (MAC) addresses of the packets. At this time, the load balancing switch 120 may allocate the packets to the servers 130 while simply circulating the servers 130 in order, or according to the capabilities or load states of the respective servers 130.

In the above structure, if the client 110 requests a streaming service, the load balancing switch 120 receives the service request, selects a proper one of the servers 130 and establishes a session between the client 110 and the selected server. This structure has a disadvantage in that high costs are required in installing the switch and changing the network configuration.

FIG. 2 is a block diagram of another traditional streaming system with a different load balancing structure. A plurality of servers 230 connected to a network constitute a cluster, and a client 210 is connected to the servers 230 through a load balancer 220. The load balancer 220 selects, from among the servers 230, a server to actually provide a service associated with each request from the client 210 on the basis of a streaming protocol and priority. In this structure, the client 210 beyond the cluster recognizes the plurality of servers 230 as one high-performance, high-availability server. At this time, streaming data to be transferred from the selected server to the client 210 must be passed through the load balancer 220.

Especially, when a software streaming service is provided through the above system, the session established between the client and the server can be divided into a first-half part which sends initial execution data to run an application program in a user computer, and a second-half part which sends only data of a specific part desired by the user after the application program is ran.

At this time, in the first-half part of the software streaming service, a large amount of data required to run the application program must be sent, resulting in necessitation of a regular, high bandwidth-on-demand. In the second-half part of the software streaming service, because desired data is sent only in response to the user'S request, the bandwidth-on-demand may be irregular and lower than that in the first-half part. As a result, in the software streaming service, the bandwidth-on-demand may be different depending on sending times even in the same session.

The load balancing technologies applied to the aforementioned traditional streaming system may include a round robin method for allocating clients?service requests to a plurality of servers in order, a hash method for performing a hash operation using source and destination information and protocols to calculate load of each server so as to perform load balancing, and a least connection scheduling method for allocating a client's service request to a server with a smallest number of connections. However, these methods do not consider the difference among the bandwidths-on-demand at the sending times at all, so they cannot efficiently and flexibly distribute load in the software streaming service where the bandwidth-on-demand is different according to the sending times.

DISCLOSURE

Technical Problem

Therefore, the present invention has been made in view of the above problems, and it is an object of the present invention to provide a load balancing method and apparatus which can efficiently distribute load to a plurality of servers providing a software streaming service where a bandwidth-on-demand is different depending on sending times, and a software streaming system using the same.

Technical Solution

In accordance with an aspect of the present invention, the above and other objects can be accomplished by the provision of a load balancing method for distributing load to a plurality of servers which provide a software streaming service to clients, comprising the steps of: classifying sessions established between the servers and the clients into first sessions which send data for initial execution and second sessions which send data desired by users after the initial execution is completed, and collecting the resulting session information of each of the servers; calculating a total load amount of each of the servers under the condition of applying different load weights to the first and second sessions; and if the software streaming service is requested by a new client, comparing the total load amounts of the servers with one another to select a server with a minimum one of the total load amounts from among the servers, and allocating the selected server to the new client such that the selected server provides the software streaming service to the new client.

In accordance with another aspect of the present invention, there is provided a load balancing apparatus for distributing load to a plurality of servers which provide a software streaming service to clients, comprising: a transmitter for transmitting information of an allocated one of the servers to a new client requesting the software streaming service; a receiver for receiving load information from the clients and servers; a load information table for managing information about sessions established between the servers and the clients on a server-by-server basis under the condition of classifying the sessions into first sessions which send initial execution data and second sessions which send data desired by users after the sending of the initial execution data is completed; and a controller for changing values of the load information table on the basis of the load information received by the receiver and allocating one of the servers having a minimum load amount to the new client requesting the software streaming service on the basis of information recorded in the load information table.

In accordance with yet another aspect of the present invention, there is provided a software streaming system comprising: a plurality of servers for providing a software streaming service; one or more clients for receiving the software streaming service; and a load balancer for managing information about sessions established between the servers and the clients on a server-by-server basis under the condition of classifying the sessions into first sessions which send data for initial execution and second sessions which send data desired by users after the initial execution is completed, and allocating one of the servers having a minimum load amount to a new client requesting the software streaming service, on the basis of the session information, wherein the new client sends a software streaming service request signal to the load balancer in response to a request from an associated user, and accesses the server allocated by the load balancer to receive the software streaming service therefrom.

Advantageous Effects

As apparent from the above description, according to the present invention, it is possible to efficiently distribute load to a plurality of servers providing a software streaming service where a bandwidth-on-demand is different depending on sending times, by accurately estimating respective load amounts of the servers in consideration of the difference among the bandwidths-on-demand at the sending times.

Furthermore, it is possible to minimize the amount of information to be exchanged between a load balancer and the servers for collection of load information of the servers, resulting in no unnecessary load increase for load balancing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF DRAWINGS

The above and other objects, features and other advantages of the present invention will be more clearly understood from the following detailed description taken in conjunction with the accompanying drawings, in which:

FIG. 1 is a block diagram of a traditional streaming system with a load balancing structure;

FIG. 2 is a block diagram of another traditional streaming system with a different load balancing structure;

FIG. 3 is a block diagram of a software streaming system according to the present invention;

FIG. 4 is a block diagram of a load balancing apparatus according to the present invention;

FIG. 5 is a schematic flow chart of a load balancing method according to the present invention; and FIG. 6 is a detailed flow chart of the load balancing method according to the present invention.

BEST MODE

Now, preferred embodiments of the present invention will be described in detail with reference to the annexed drawings. In the drawings, the same or similar elements are denoted by the same reference numerals even though they are depicted in different drawings.

FIG. 3 schematically shows the configuration of a software streaming system according to the present invention. As shown in this drawing, the software streaming system according to the present invention comprises a client 310, a load balancer 320, and a plurality of servers 330.

The client 310 is provided in a user computer and is adapted to request the load balancer 320 to allocate a server for provision of a software streaming service and, if the load balancer 320 transmits information regarding a specific one of the servers 330 in response to the request, access the specific server 330 to receive the software streaming service therefrom.

The load balancer 320 collects information about sessions of each of the servers 330, calculates a load amount of each server 330 on the basis of the collected session information, and, if the client 310 requests the server allocation, provides information regarding one of the servers 330 having a minimum one of the calculated load amounts to the client 310.

Mode for Invention

FIG. 4 shows the configuration of the load balancer 320 in detail. As shown in this drawing, the load balancer 320 includes a load information table 320a for managing information about sessions established between the servers 330 and clients on a server-by-server basis under the condition of classifying the sessions into first sessions which send initial execution data and second sessions which send data desired by the users after the sending of the initial execution data is completed, a controller 320b for changing values of the load information table 320a on the basis of a signal received by a receiver 320d and allocating one of the servers 330 having a minimum load amount to the client 310 requesting the software streaming service, on the basis of information recorded in the load information table 320a, and a transmitter 320c for transmitting information regarding the server allocated by the controller 320b to the client 310 requesting the software streaming service. The receiver 320d is adapted to receive signals from the client 310 and servers 330.

The load balancer 320 according to the present invention estimates the load amounts of the servers 330 in the following manner. That is, the load balancer 320 classifies the sessions of each of the servers 330 into first sessions which correspond to the first-half part of the software streaming service and send data for initial execution and second sessions which correspond to the second-half part of the software streaming service and send data desired by the users after the initial execution is completed. Then, the load balancer 320 calculates the total load amount of each of the servers 330 under the condition of applying a higher load weight to the first sessions than that to the second sessions. At this time, the ratio between the load weights of the first and second sessions is set in proportion to the ratio between bandwidths-on-demand in the first and second sessions. Therefore, it is possible to estimate the load amounts of the servers 330 more accurately.

The load balancer 320 employs the load information table 320a to manage such load information of the servers.

The load information table 320a is configured to manage the load amount of each of the servers 330 in such a manner that the number of first sessions and the number of second sessions of each of the servers 330 can be confirmed discriminatively.

TABLE 1

|  | SERVER 1 | SERVER 2 | SERVER 3 | ... | SERVER N | REMARK (WEIGHT) |
|---|---|---|---|---|---|---|
| NUMBER OF SESSIONS (S) | 10 | 14 | 9 |  | 21 | a = 1 |
| INITIAL EXECUTION (I) | 4 | 7 | 8 |  | 1 | b = 7 |
| TOTAL LOAD AMOUNT (T) | 34 | 56 | 57 |  | 27 |  |

The above table 1 shows an embodiment of the load information table 320a. As seen from this table 1, the load information table 320a includes the number S of total sessions of each server 330 and the number I of first sessions among the total session number S. The load information table 320a further includes the total load amount T of each server 330 obtained by applying different load weights to the first and second sessions.

The total session number S of each server 330 can be managed on the basis of information regarding server allocation made when the client 310 requests the software streaming service, and a software streaming service termination signal transferred from a corresponding one of the servers 330, and the first session number I of each server 330 can be managed on the basis of the information regarding the server allocation made when the client 310 requests the software streaming service, and an initial execution data sending completion signal transferred from the corresponding server. In the present embodiment, the number of second sessions can be obtained by subtracting the first session number I from the total session number S.

Using the total session number S and the first session number I, the total load amount T can be obtained as in the following math figure 1.

$$T = I \times b + \{(S-I) \times a\} \quad [\text{Math Figure 1}]$$

In the above math figure 1, T is the total load amount, I is the number of first sessions, S is the number of total sessions, a is a load weight applied to the second sessions, and b is a load weight applied to the first sessions. Here, the load weight b of the first sessions is set to be higher than the load weight a of the second sessions.

For example, in the present embodiment, a is set to 1 and b is set to 7. In this case, the total load amounts of the servers 1, 2, 3 and N are 34, 56, 57 and 27, respectively. In a traditional load balancer that determines the load amounts merely according to whether the number of sessions is large or small, it is determined that a largest amount of load has been applied to the server N whose total session number is largest. In contrast, if the load amounts are determined by the load balancer according to the present invention, it is determined that a largest amount of load has been applied to the server 3 whose total session number is small, but whose first session number is largest.

These results of load amount determination according to the present invention are close to the actual load amounts applied to the respective servers, thus raising reliability of the load balancing effect.

It is possible to adjust the ratio between a and b according to the amount of initial execution data.

Further, the software streaming system with the above-stated structure can acquire information about loads of the plurality of servers 330 on the basis of only whether the first session completion has been made and whether the session termination has been made. Therefore, it is possible to minimize the amount of information to be exchanged between the load balancer 320 and the plurality of servers 330, resulting in no unnecessary load increase for load information collection.

Next, a load balancing method of the above-described software streaming system will be described with reference to FIGS. 5 and 6.

FIG. 5 is a schematic flow chart of the load balancing method according to the present invention. First, the load balancer 320 collects basic information for calculation of load amounts of the plurality of servers 330. At this time, the load balancer 320 classifies sessions of each of the servers 330 into first sessions which send data for initial execution and second sessions which send data desired by the users after the initial execution is completed, and collects the number of the first sessions and the number of the second sessions of each of the servers 330 (S510). The load balancer 320 employs the load information table 320a to manage such load amounts of the servers. At this time, the load balancer 320 may manage the load amount of each server on the basis of the number of total sessions of each server, which is the sum of the number of the first sessions and the number of the second sessions of each server, instead of the number of the second sessions.

The load balancer 320 then calculates the total load amount of each of the servers 330 under the condition of applying a higher load weight to the first sessions than that to the second sessions (S520). At this time, the total load amount can be calculated as in the above math figure 1.

If the software streaming service is requested by the client 310 under the above condition, this service request is sent to the load balancer 320. Upon receiving the software streaming service request, the load balancer 320 compares the total load amounts of the servers 330, calculated at the above step S520, with one another to select a server with a minimum one of the load amounts from among the servers 330, and allocates the selected server to the client 310 (S530).

Thereafter, a session is established between the allocated server 330 and the client 310 to provide the software streaming service to the client 310 (S540). In other words, if the load balancer 320 provides information (for example, an address) of the allocated server 330 having the minimum load amount to the client 310, the client 310 requests the software streaming service of the allocated server 330, resulting in a session being established between the client 310 and the allocated server 330. As a result, data is sent over the established session.

Meanwhile, when the load information is subject to a change, such as addition of a new session to the plurality of servers 330, completion of the sending of the initial execution data, or session release, the load balancer 320 collects the changed load information at step S510 and calculates the total load amount of each server again at step S520.

By repeating the above steps 510 to 530 in the above manner, the load amounts of the plurality of servers 330 can be maintained almost equally, thereby preventing load from being excessively concentrated on only a specific one of the servers, thus improving quality of service.

FIG. 6 is a flow chart illustrating the load balancing method according to the present invention in detail in association with the load balancer 320. First, the load balancer 320 waits for reception of signals from the client 310 and servers 330 to collect load information (S601).

If a signal is received in the wait state, the load balancer 320 determines whether the received signal is a service request signal from the client 310 or a signal from an arbitrary one of the servers 330 (S602).

Upon determining that the received signal is the service request signal from the client 310, the load balancer 320 selects a server with a minimum total load amount from among the servers 330 with reference to the load information table 320a (S603), transfers information of the selected server 330 to the client 310 (S604), and increments each of the number S of total sessions and the number I of first sessions of the selected server in the load information table 320a by one (S605).

If the received signal is determined to be the signal from the arbitrary server, the load balancer 320 determines whether the received signal indicates completion of the sending of initial execution data or release of a specific session (S606). If the received signal indicates the completion of the sending of the initial execution data, the load balancer 320 decrements the number I of first sessions of the arbitrary server in the load information table 320a by one (S607). However, if the received signal indicates the release of the specific session, the load balancer 320 decrements the number S of total sessions of the arbitrary server in the load information table 320a by one (S608).

If the load information of the load information table 320a is changed at the above step S605, S607 or S608, the load balancer 320 calculates the total load amount of the corresponding server again on the basis of the changed information (S609) using the math figure 1 and changes the total load amount T of the corresponding server in the load information table 320a to the calculated amount (S610). This changed total load amount T is used in selecting a server to be allocated to an arbitrary client in response to a streaming service request signal from the arbitrary client, received next.

As apparent from the above description, according to the present invention, it is possible to efficiently distribute load to a plurality of servers providing a software streaming service where a bandwidth-on-demand is different depending on sending times, by accurately estimating respective load amounts of the servers in consideration of the difference among the bandwidths-on-demand at the sending times.

Furthermore, it is possible to minimize the amount of information to be exchanged between a load balancer and the servers for collection of load information of the servers, resulting in no unnecessary load increase for load balancing. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A load balancing method for distributing load to a plurality of servers which provide a software streaming service to clients, comprising:
classifying sessions established between the servers and the clients into first sessions which send data for initial execution and second sessions which send data desired by users after the initial execution is completed, and collecting the resulting session information of each of the servers;
calculating a total load amount of each of the servers under the condition of applying different load weights to the first and second sessions,
wherein the calculating the total load amount includes calculating the total load amount of each of the servers using the following equation:

$$T = I \times b + \{(S-I) \times a\}$$

where T is the total load amount, I is the number of the first sessions, S is the number of total sessions, b is the load weight applied to the first sessions, and a is the load weight applied to the second sessions; and
comparing the total load amounts of the servers with one another to select a server with a minimum one of the total load amounts from among the servers when the software streaming service is requested by a new client, and allocating the selected server to the new client such that the selected server provides the software streaming service to the new client.

2. The load balancing method as set forth in claim 1, wherein collecting the resulting session information of each of the servers includes collecting a software streaming service request signal from each of the clients, and an initial execution completion signal and a service termination signal from each of the servers, the initial execution completion signal indicating completion of the sending of the initial execution data, the service termination signal indicating session release.

3. The load balancing method as set forth in claim 2, wherein collecting the resulting session information of each of the servers further includes:
incrementing each of the number of total sessions and the number of the first sessions of the server allocated to the new client by one if the software streaming service request signal from the new client is received;
decrementing the number of the first sessions of an arbitrary one of the servers by one if the initial execution completion signal from the arbitrary server is received; and
decrementing the number of total sessions of the arbitrary server by one if the service termination signal from the arbitrary server is received.

4. The load balancing method as set forth in claim 1, wherein a ratio between the load weights of the first and second sessions is set in proportion to a ratio between bandwidths-on-demand in the first and second sessions.

5. The load balancing method as set forth in claim 1, wherein a ratio between the load weights of the first and second sessions is set in proportion to a ratio between bandwidths-on-demand in the first and second sessions.

6. A load balancing apparatus for distributing load to a plurality of servers which provide a software streaming service to clients, comprising:
a transmitter to transmit information of an allocated one of the servers to a new client requesting the software streaming service;
a receiver to receive load information from the clients and servers;

a load information table to manage information about sessions established between the servers and the clients on a server-by-server basis under the condition of classifying the sessions into first sessions which send initial execution data and second sessions which send data desired by users after the sending of the initial execution data is completed, wherein the total load amount of each of the servers in the load information table is calculated using the following equation:

$$T = I \times b + \{(S-I) \times a\}$$

where T is the total load amount, I is the number of the first sessions, S is the number of the total sessions, be is the load weight applied to the first sessions, and a is the load weight applied to the second sessions; and a controller to change values of the load information table on the basis of the load information received by the receiver and allocating one of the servers having a minimum load amount to the new client requesting the software streaming service on the basis of information recorded in the load information table.

7. The load balancing apparatus as set forth in claim 6, wherein the load information table includes:

the number of total sessions of each of the servers;

the number of the first sessions among the total session number;

load weights applied respectively to the first and second sessions; and a total load amount of each of the servers calculated by applying the load weights to the first and second sessions.

8. The load balancing apparatus as set forth in claim 7, wherein the controller increments each of the number of the total sessions and the number of the first sessions of the server allocated to the new client in the load information table by one if a software streaming service request signal from the new client is received, decrements the number of the first sessions of an arbitrary one of the servers in the load information table by one if an initial execution completion signal from the arbitrary server is received, and decrements the number of the total sessions of the arbitrary server in the load information table by one if a service termination signal from the arbitrary server is received.

9. The load balancing apparatus as set forth in claim 7, wherein a ratio between the load weights of the first and second sessions in the load information table is set in proportion to a ratio between bandwidths-on-demand in the first and second sessions.

10. A software streaming system comprising:

a plurality of servers to provide a software streaming service;

one or more clients to receive the software streaming service; and a load balancer to manage information about sessions established between the servers and the clients on a server-by-server basis under the condition of classifying the sessions into first sessions which send data for initial execution and second sessions which send data desired by users after the initial execution is completed, and allocating one of the servers having a minimum load amount to a new client requesting the software streaming service, on the basis of the session information, wherein the load balancer calculates the total load amount of each of the servers using the following equation:

$$T = I \times b + \{(S-I) \times a\}$$

where T is the total load amount, I is the number of the first sessions, S is the number of the total sessions, b is the load weight applied to the first sessions, and a is the load weight applied to the second sessions, where-in the new client sends a software streaming service request signal to the load balancer in response to a request from an associated user, and accesses the server allocated by the load balancer to receive the software streaming service therefrom.

11. The software streaming system as set forth in claim 10, wherein the load balancer includes a load information table, the load information table including the number of total sessions of each of the servers, the number of the first sessions among the total session number, load weights applied respectively to the first and second sessions, and a total load amount of each of the servers calculated by applying the load weights to the first and second sessions.

12. The software streaming system as set forth in claim 11, wherein:

each of the servers provides an initial execution completion signal and a service termination signal to the load balancer, the initial execution completion signal indicating completion of the sending of the initial execution data, the service termination signal indicating session release; and the load balancer increments each of the number of the total sessions and the number of the first sessions of the server allocated to the new client in the load information table by one if the software streaming service request signal from the new client is received, decrements the number of the first sessions of an arbitrary one of the servers in the load information table by one if the initial execution completion signal from the arbitrary server is received, and decrements the number of the total sessions of the arbitrary server in the load information table by one if the service termination signal from the arbitrary server is received.

* * * * *